United States Patent
Joseph et al.

(10) Patent No.: US 9,996,649 B2
(45) Date of Patent: *Jun. 12, 2018

(54) ON THE FLY NETLIST COMPRESSION IN POWER ANALYSIS

(71) Applicant: International Business Machines Corporation, Armonk, NY (US)

(72) Inventors: Arun Joseph, Bangalore (IN); Rahul M. Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/384,447

(22) Filed: Dec. 20, 2016

(65) Prior Publication Data

US 2017/0315605 A1   Nov. 2, 2017

Related U.S. Application Data

(63) Continuation of application No. 15/139,525, filed on Apr. 27, 2016.

(51) Int. Cl.
*G06F 17/50* (2006.01)
*G06F 1/32* (2006.01)

(52) U.S. Cl.
CPC .............. *G06F 17/505* (2013.01); *G06F 1/32* (2013.01); *G06F 17/5009* (2013.01)

(58) Field of Classification Search
CPC ... G06F 1/3296; G06F 17/505; G06F 17/5009
USPC .......................... 716/103, 107, 109, 127, 133
See application file for complete search history.

(56) References Cited

U.S. PATENT DOCUMENTS

| | | | |
|---|---|---|---|
| 7,937,678 B2 * | 5/2011 | Lippmann | G06F 17/505 716/103 |
| 8,413,085 B2 | 4/2013 | Green | |
| 8,954,906 B1 | 2/2015 | Baeckler et al. | |
| 2002/0199160 A1 | 12/2002 | Fujine | |
| 2003/0106030 A1 * | 6/2003 | Keller | G06F 17/5036 716/115 |
| 2009/0313596 A1 | 12/2009 | Lippmann et al. | |
| 2014/0365148 A1 | 12/2014 | Tehranipoor et al. | |

(Continued)

OTHER PUBLICATIONS

Silvant, "How do you qualify netlist reduction and circuit extraction?" EE Times, Jan. 4, 2010, 3:00 PM. http://www.eetimes.com/document.asp?doc_id=1276209. Last printed Jan. 5, 2016, 1:33PM. 5 pages.

(Continued)

*Primary Examiner* — Jack Chiang
*Assistant Examiner* — Brandon Bowers
(74) *Attorney, Agent, or Firm* — Nicholas D. Bowman

(57) ABSTRACT

A method for analyzing power in a circuit includes identifying equivalent elements in a source netlist representing the circuit. Abstract elements are formed combining the equivalent elements of the source netlist. A reduced netlist is formed, substituting the abstract elements in the reduced netlist for the collective equivalent elements in the source netlist. Metrics or properties associated with equivalent elements of the source netlist are combined and associated, in the reduced netlist, with the abstract elements. The reduced netlist can be analyzed with results equivalent to analyzing the source netlist.

1 Claim, 9 Drawing Sheets

(56) References Cited

U.S. PATENT DOCUMENTS

2015/0199460 A1    7/2015   Sundaresan et al.

OTHER PUBLICATIONS

Joseph et al., "On The Fly Netlist Compression In Power Analysis," U.S. Appl. No. 15/139,525, filed Apr. 27, 2016.
List of IBM Patents or Patent Applications Treated as Related, Signed Dec. 20, 2016, 2 pages.

\* cited by examiner

ON THE FLY NETLIST COMPRESSION IN POWER ANALYSIS

BACKGROUND

The present disclosure relates to power analysis in a circuit, and more specifically, to forming a compressed netlist to perform the analysis.

SUMMARY

According to embodiments of the present disclosure, a circuit includes a plurality of circuit cells and wires. A method to analyze electrical power in the circuit includes a source netlist having circuit nodes that correspond to cells in the circuit, and circuit edges that correspond to wires in the circuit. The method includes forming a compressed circuit node that combines, from circuit nodes within the source netlist, a first circuit node and at least one second circuit node that have a node equivalence. The method further includes forming a first compressed circuit edge that combines, from circuit edges within the source netlist, a first circuit edge and at least one second circuit edge that have an edge equivalence.

Embodiments of the method form a reduced netlist that substitutes the compressed node for the first circuit node and second circuit nodes, and substitutes the first compressed edge for the first circuit edge and second circuit edges. Embodiments further associate a lumped node metric with the compressed node, in the reduced netlist, that combines a node metric associated with each of the first circuit node and the second circuit nodes. A first lumped edge metric is associated with the first compressed edge, in the reduced netlist, that combines a first edge metric associated with each of the first edge node and the second circuit edges.

Some embodiments of the present disclosure form a second compressed node that combines a third circuit edge and a third circuit node. The third circuit edge is a circuit edge from a group consisting of the first compressed circuit edge and at least one fourth circuit edge included in the source netlist. The third circuit node is a circuit node from a group consisting of the compressed circuit node and at least one forth circuit node included in the source netlist. The second compressed node is formed based on the third circuit edge and the third circuit node having the same output states when receiving the same input states and held in a static state of operation.

In some embodiments of the present disclosure, the node equivalence is a logical or a functional equivalence. Logical equivalence comprises the first circuit node and one combination of the second circuit nodes having the same operational activity, the first circuit node and a second combination of the ne second circuit nodes having the same input and output states when held in a static state of operation, and the first circuit node and a third combination of the second circuit nodes being cloned nodes that receive a common signal source. Functional equivalence comprises the first circuit node and the second circuit nodes producing the same output states when each receive of the same input states.

In some embodiments, analyzing power in the circuit determines dynamic power, leakage power, or short-circuit power; the lumped node metric and node metric are device capacitance, cross-over current capacitance, or leaking width; and the first lumped edge metric and the first edge metric are wire capacitance.

According to some embodiments of the present disclosure, a computer program product includes instructions executable by a computing device to perform methods of the disclosure. In some embodiments, a computer system includes a source netlist according to the disclosure, an interface to receive the source netlist, and a processor coupled to the interface. The processor is configured to execute instructions to perform methods of the disclosure and to form a reduced netlist. In embodiments the instructions are, optionally, stored in a memory communicatively coupled to the processor. Embodiments, optionally, store the reduced netlist in the memory.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
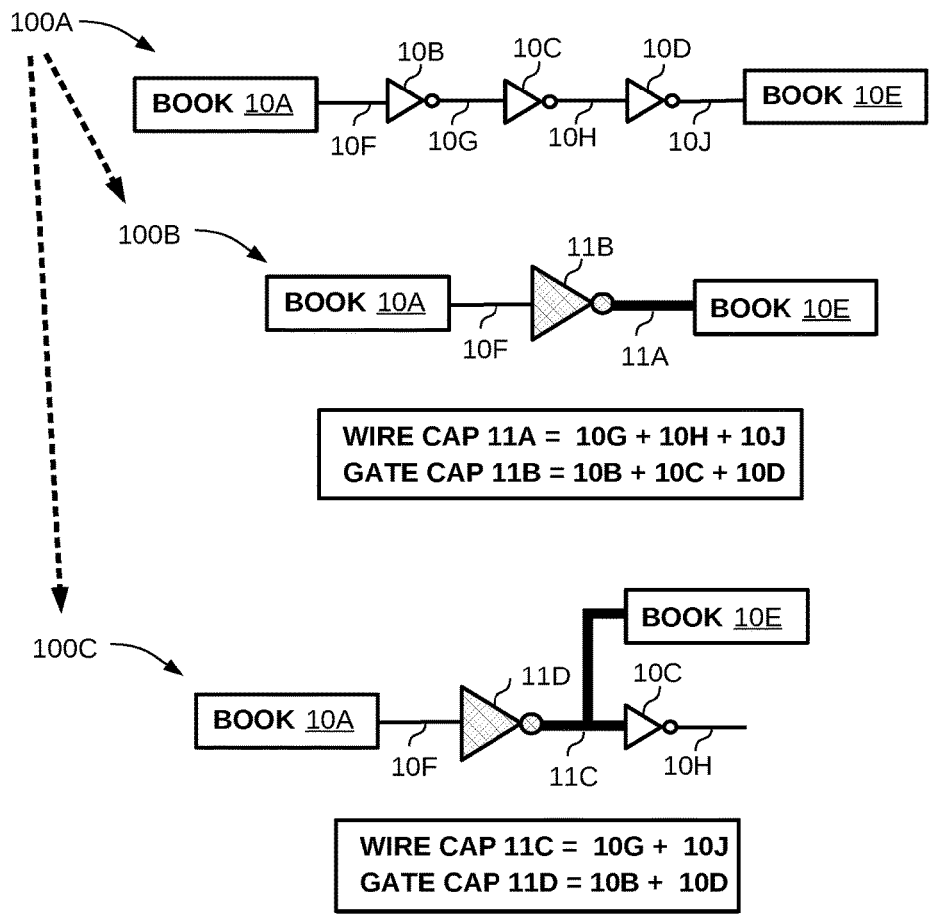
FIG. 1A is a block diagram illustrating two example reduced netlists, according to embodiments of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to analyzing characteristics of electronic circuits having a plurality of interconnected circuit cells. More particular aspects relate to identifying equivalent cells and interconnections in a source netlist and combining, or "compressing", the equivalents into abstract components that substitute, in a reduced netlist, for the source netlist equivalent components. Analysis of the reduced netlist can produce a result equivalent to analysis of the source netlist. While the present disclosure is not necessarily limited to such applications, various aspects of the disclosure may be appreciated through a discussion of various examples using this context.

Electronic circuits or, for example, logic circuits formed of electronic components can include particular circuit cells. As used herein, "electronic circuit", or "circuit" (where not otherwise qualified or characterized) refers to any circuit comprising interconnected electronic components, including logic circuits implemented using electronic components. In embodiments, an electronic or a logic circuit cell (hereinafter, "circuit cell") can be, or function as, (for example) a logic function, such as an AND/NAND, OR/NOR, or inverter element or gate; a clock; a memory cell, a latch or latch tree, or an arithmetic unit; or, a combination of the foregoing. A circuit cell can be (for example) a transistor, a capacitor, a resistor, or a wire; a clock generation circuit or a clock buffer; or, a combination of the foregoing. In some embodiments, logic cells be synthesized, or implemented, as electronic cells or components.

In some embodiments, a particular combination of circuit components, or cells, can comprise a circuit design block, or circuit "book". For example, a circuit book (hereinafter, "book") can be a combination of transistors or electronic components, and/or logic cells, configured in a particular manner to perform a particular electronic or logic function within a circuit. A book can be included, for example, in a "library" of commonly used circuit design blocks (e.g., books). A circuit can include one, or multiple, instance of a particular book, and a particular book can comprise a cell within a circuit.

A circuit can be analyzed for a variety of properties, which can include, for example, analysis of power properties or behaviors of the circuit or a particular sub-circuit, or a particular cell or interconnection (e.g., a wire) between cells, within the circuit. For example, an electronic circuit can be analyzed to determine AC or DC power properties, such as dynamic power, leakage power, or short circuit power. Dynamic power in a circuit can be, for example, power consumed, or required, in relation to transistor switching (e.g., transitioning between high and low voltages) while a circuit is operating.

Leakage power can be, for example, power lost to a combination of transistors that implement a particular circuit function. For example, a logic inverter can be formed of two transistors (e.g., a top and bottom transistor) and the inverter can be designed such that in a particular input state (e.g., logical 1 or 0, corresponding, respectively, to a high or low voltage) one of the transistors in the inverter (e.g., the "top" transistor) is "on" and the other (e.g., the "bottom" transistor) is "off". Even though the input state to the inverter, and its corresponding output state, is stable (not changing), when the circuit is operating (i.e. power supply to the circuit is maintained) the inverter consumes "leakage" power corresponding to the power consumed by the "off" transistor within the inverter.

A combination of transistors, such as the two (top and bottom) transistors forming the example inverter, can also produce a "short circuit" power. Short circuit power can be power consumed in relation to an input state (e.g., a high voltage) to the two transistors changing (e.g., to a low voltage). As the transistors respond to the changing input state, the changing input state can have an "input pin slew", or ramping up or down (versus, for example, an instantaneous change), of the input state(s). Such an input pin slew can produce a temporary state in which both transistors are simultaneously operating and the additional power consumed while in this state can be referred to as "short circuit" power.

Analyzing power properties of electronic circuits can incorporate particular operating properties of a cell or wire, such as capacitance or "leaking width". A circuit cell or wire can be associated with, or have, a particular electrical capacitance. For example, a circuit cell can have a "gate" (e.g., transistor device) capacitance associated with the transistor(s) forming, or included in, the cell. A wire can have a "wire capacitance" derived, for example, from its material (e.g., a particular metal type) or geometry (e.g., its length or cross-section, or volumetric combination thereof).

Leakage power (which can be a component of DC power) of a circuit cell can be associated with a "leakage width" of the cell. In some embodiments, leakage width can be derived, for example, from the total physical width of the transistor and the fraction of time that the transistor is off (inactive) with respect to the full time operation of the circuit is simulated in an analysis. For example, the fraction of time, or "duty cycle" that a transistor (e.g., the top transistor) in a two-transistor inverter cell is inactive (e.g., in an analysis) can be 50%, if the design of the cell is such that the transistors are complementary to each other.

The leakage width can also be associated with the geometric width of the gate of that transistor, such that a leakage width for a gate can be a multiple of its duty cycle and its gate (e.g., transistor device or devices) width, and leakage width of the cell can be the combined leakage width of the two transistors. For example, leakage width of the inverter cell can be the gate width of the top transistor, times its duty cycle (e.g., 50%), plus the gate width of the bottom transistor times the duty cycle of the bottom transistor (e.g., 50%).

A circuit can be represented as a "netlist", which can be a type of graph in which netlist nodes represent circuit cells and netlist edges represent circuit wires that interconnect the nodes. However, it will be understood by one of ordinary skill in the art that "node" is an abstraction of a component of a circuit, and "edge" is an abstraction of a wire interconnecting components of a circuit. In embodiments, a netlist can be formally a graph of abstract nodes and edges. Alternatively, in an embodiment can be a graph incorporating another representation of a cell and/or wires such as, for example, a description of a cell, and/or cell interconnections, used to synthesize the electronic components of the cell and their electronic interconnections, or to fabricate the cell as a semiconductor circuit. Accordingly, for purposes of illustrating the disclosure, herein the terms "node" and "cell", are used interchangeably, and the terms "edge" and "wire" are used interchangeably, with respect to netlists representing a circuit.

A netlist can be analyzed to determine particular properties or behaviors of the circuit, or particular cells and/or wires forming the circuit. A power analysis, for example, can determine power properties of the circuit (e.g., dynamic (e.g., AC), leakage (e.g., DC), or short circuit power) by analyzing the electrical behavior of the nodes (e.g., cells) and edges (e.g., wires) in the netlist. A computer program, for example, can perform power analysis of a circuit, represented as (for example) a netlist, by analyzing the electrical behavior of the cells and wires in the netlist in response to particular stimuli (e.g., a series of inputs) or conditions (e.g., particular dynamic or "corner" voltages or temperatures).

However, modern electronic and logic circuits can be composed of many thousands, or even millions, of electronic or logic components or cells in complex configurations or arrangements. A netlist representing such a circuit, correspondingly, can be composed of many thousands, or even millions, of nodes (e.g., cells) and edges (e.g., wires) in complex configurations or arrangements. Manually analyzing such circuits is impractical, and computer analysis, for such large-scale circuit (or, netlists) can require a large number of very powerful computers or require an exceedingly large amount of time.

A "reduced" netlist, can be formed by substituting, for nodes and/or edges in a "source" netlist, an abstract (e.g., "compressed"), nodes and/or edges that in some manner combines nodes and or edges in a source netlist. For example, to perform power analysis of a circuit, nodes and/or edges within a source netlist can be combined into an abstract node and/or an abstract edge according to particular criteria. However, it can be necessary, in a power analysis, then to create a "power model" of the abstract nodes in the reduced netlist, specific to the particular power analysis desired, and to create such a power model of each such abstract node, separate from performing the power analysis. This can require performing multiple, separate or independent, methods or processing passes, of a source and/or reduced netlist to prepare or perform a circuit analysis.

In electronic circuits it can be possible to identify logically or functionally equivalent nodes (e.g., cells) and/or edges (e.g., wires) within a source netlist representing the circuit. In embodiments, "logically equivalent" nodes in a netlist can be, for example, nodes that have the same operational activity, are held in the same static state of operation, or that are replicas, or clones, of each other that sink (e.g., receive) a common signal source. Nodes can have the same operational activity, for example, if the nodes perform the same function (e.g., electrically buffer a clock signal), or as a combination of nodes, produce the same state at the output of the combination, for the same input to the combination of nodes, as another node. The disclosure includes example netlists that include nodes having various conditions of logical equivalence.

In embodiments, nodes in a netlist that have the same function or that, for the same logical input states, produce the same logical output state, can be "functionally equivalent". For example, inverters, AND gates, NAND gates, OR gates, NOR gates, or latches can each be functionally-equivalent of one another (i.e., one inverter can be functionally-equivalent to another, one inverter can be functionally-equivalent to a series connection of three inverters, one AND gate be functionally-equivalent to another, etc.).

It can be possible, further, to identify logically equivalent edges within a netlist. For example, input and/or output edges (e.g., wires) that connect to logically or functionally equivalent nodes (e.g., cells), or that connect a series of nodes that cancel each other (e.g., logically, such as an even number of inverters in series) can be logically equivalent.

As used herein, "equivalent", with respect to nodes and/or edges of a netlist, refers to nodes and/or edges that are either logically equivalent or are functionally equivalent in a source netlist. In embodiments of the disclosure, identifying equivalent nodes (e.g., cells) and/or edges (e.g., wires) in a source netlist, and combining (e.g., compressing) these into abstract nodes and/or edges to form a reduced netlist, can be performed "on-the-fly". For example, a reduced netlist can be formed of abstract nodes and/or edges while performing power analysis of a source netlist, and without requiring multiple or separate methods or passes to process the source netlist or perform the analysis.

Analyzing a reduced netlist (e.g., to perform power analysis) can produce results equivalent to analysis of the source netlist for the same particular properties, while requiring less computing power and/or time to perform the analysis. Accordingly, embodiments of the present disclosure include a method to identify and combine equivalent nodes (e.g., cells) of a source netlist into an abstract node, and equivalent edges (e.g., wires) of the source netlist into an abstract edge, to form a reduced netlist. Analysis of the circuit can then be performed using the reduced netlist.

An abstract node or edge in a reduced netlist can combine, or "lump" (e.g., sum), particular operating parameters or metrics of the source netlist equivalent nodes and/or edges. For example, an abstract node or edge can lump parameters such as capacitance (e.g., capacitance of a wire or device capacitance of a transistor, transistor gate, or other electronic component comprising a node), cross-over (or, "shoot through") current capacitance and/or leakage width of a transistor (or, other electronic) device—of equivalent nodes and/or edges in the source netlist. A reduced netlist can incorporate the abstract nodes and edges, and their lumped parameters or metrics, in substitution for the equivalent nodes and edges of the source netlist, and their individual parameters or metrics. As used herein, "reduced netlist" refers to a netlist that substitutes abstract nodes (e.g., circuit cells) and edges (e.g., circuit wires) for the equivalent nodes (e.g., cells) and/or edges (e.g., wires) in a source netlist, and in which the abstract nodes and edges lump operating parameters or metrics of the source netlist equivalent nodes and edges, respectively.

Figure 1B:
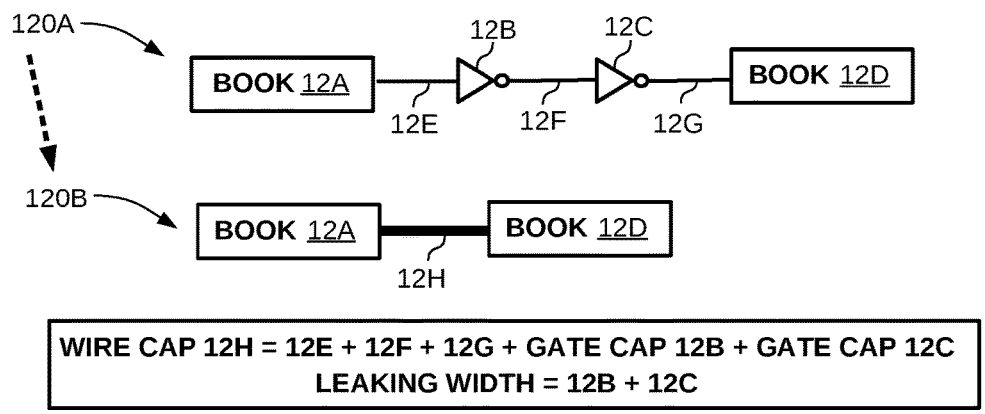
FIG. 1B is a block diagram illustrating an example of a third reduced netlist, according to embodiments of the disclosure.

In embodiments it is possible to compress nodes across a combination of nodes such that the function of the combination of nodes is preserved. For example, given particular inputs a compressed node can produce the same output(s), under particular operating conditions, as the un-compressed combination of nodes in the source netlist given those same inputs and same operating conditions. The compressed node (and, optionally, associated abstract edges) can substitute in the reduced netlist for the uncompressed source netlist nodes. In alternative embodiments, a reduced netlist can include compressed nodes (and, optionally, associated abstract edges) combining only equivalent (e.g., logically equivalent) nodes within a combination of source netlist nodes. FIGS. 1A and 1B illustrate example circuits that have nodes that can be combined in reduced netlists in which nodes are combined (e.g., merged) across a combination of nodes (reduced netlist 100B) or, alternatively, in which only logically equivalent nodes are combined (reduced netlist 100C).

In FIG. 1A, source netlist 100A represents a circuit (which, alternatively, can be a sub-circuit of a larger circuit) comprised of books connected through inverters. Book 10A is connected to book 10E through inverters 10B-10D. The series of inverters 10B through 10D result at output 10J in an inversion logic state of input 10F such that, as a series of nodes, they can be functionally equivalent to a single inverter node. Accordingly, the three inverters (10B-10D) can be compressed into abstract inverter 11B, substituting for source netlist series of inverters between book 10A and book 10E in reduced netlist 100B. Correspondingly, the inverter outputs 10G, 10H, and 10J can be compressed into abstract output edge 11A in netlist 100B, substituting in netlist 100B for source netlist 100A output edge 10J.

For purposes of, for example, performing power analysis of the circuit, abstract inverter 11B can be assigned, for example, a lumped capacitance (e.g., lumped gate and/or cross-over current capacitance), or a leaking width, combining the individual capacitances, and/or leaking widths, respectively, of inverters 10B-10D. For example, as illustrated in FIG. 1A, in some embodiments the lumped capacitance and/or leaking width, of abstract inverter 11B can be the sum of the capacitances, and/or leaking width, respectively, of inverters 10B, 10C, and 10D. In other embodiments, the capacitance and/or leaking width, of an abstract node can be determined according to other combinations of the individual source netlist node capacitances and/or leaking width (e.g., mathematical formulas that include cell or component geometries or other such properties).

In netlist 100A output edge 11A can further be assigned, for example, a lumped capacitance. For example, edge 11A can have a lumped capacitance that is the sum of the capacitances of output edges 10G, 10H, and 10J. In other embodiments, the capacitance of an abstract edge can be determined according to other combinations of the individual source netlist node and/or edge capacitances (e.g., mathematical formulas that include wire, cell, or component geometries or other such properties).

FIG. 1A further illustrates an alternative example netlist, 100C, which can be formed from source netlist 100A by combining nodes that have a logical equivalence. Netlist 100C can be formed, for example, to account for the effect of input pin state on leakage power of a node in a power analysis of the source netlist circuit. In netlist 100A, the logical value of outputs 10G in the inverted logic state of input 10F. As input 10F passes through two inverters (10B and 10C), the logical state of 10H, as an input to inverter 10D, is the same as that of 10F and inverter 10D has the same logic function as 10B.

Accordingly, inverters 10B and 10D can be logically equivalent and to combined to form compressed node 11D in netlist 100C. Corresponding logically equivalent output edges 10G and 10J can be compressed into abstract edge 11C, substituting in netlist 100C for source netlist 100A output edge 10G. In netlist 100C, abstract node 11D presents the same input to book 10E and inverter 10C as series of inverters 10B through 10D in source netlist 100A.

For purposes of, for example, performing power analysis of the circuit, abstract inverter 11D in netlist 100C can be assigned, for example, a lumped capacitance (e.g., lumped gate or cross-over current capacitance), or leaking width, combining the individual capacitances, and/or leaking width, respectively, of netlist 100A inverters 10B and 10D. In netlist 100C output edge 11A can be assigned, for example, a lumped capacitance combining the capacitances of netlist 100A output edges 10G and 10J.

In embodiments the lumped capacitance and/or leaking width, of abstract inverter 11D can be, for example, the sum of the capacitances, and/or leaking width, respectively, of inverters 10B and 10D, and output edge 11C can have a lumped capacitance that is, for example, the sum of the capacitances of output edges 10G and 10J. In alternative embodiments, the lumped capacitance and/or lumped leaking width, of an abstract node and/or edge can be determined according to other combinations of the individual source netlist node and/or edge capacitances and/or leaking widths (e.g., mathematical formulas that include cell or component geometries or other such properties).

FIG. 1B illustrates an example circuit and in which a series of components functionally cancel each other to allow combining these components into an abstract edge. Source netlist 120A represents the circuit and includes two inverters, 12B and 12C, connected in series between books 12A and 12D. The series of inverters 12A and 12D present the same logic state input value to book 12D (on edge 12G) as is output from book 12A on edge 12E. Accordingly, inverters 12B and 12C are functionally equivalent to an edge and, in combination with their associated edges 12E, 12F, and 12G, can be compressed (in some embodiments) into abstract edge 12H, in substitution in netlist 120B for the series of inverters and edges of netlist 120A between books 12A and 12D.

Edge 12H can further be assigned, for example, a lumped capacitance. For example, edge 11A can have a lumped capacitance that is the sum of the capacitances (e.g., gate and/or cross-over current capacitance) of edges 10F, 10G, and 10H. In other embodiments, the lumped capacitance of an abstract edge can be determined according to other combinations of the individual source netlist node and/or edge capacitances (e.g., mathematical formulas that include wire, cell, or component geometries or other such properties).

While the examples of FIGS. 1A and 1B describe lumping capacitance and/or leaking widths, it would be apparent to one of ordinary skill in the art to lump other metrics, parameters, or properties of nodes and edges (e.g., other metrics or properties associated with analyzing electrical power in a circuit) in forming a netlist with abstract nodes and edges replacing collections of logically equivalent nodes (e.g., cells) and/or edges (e.g., wires) included in a source netlist.

Figure 2:
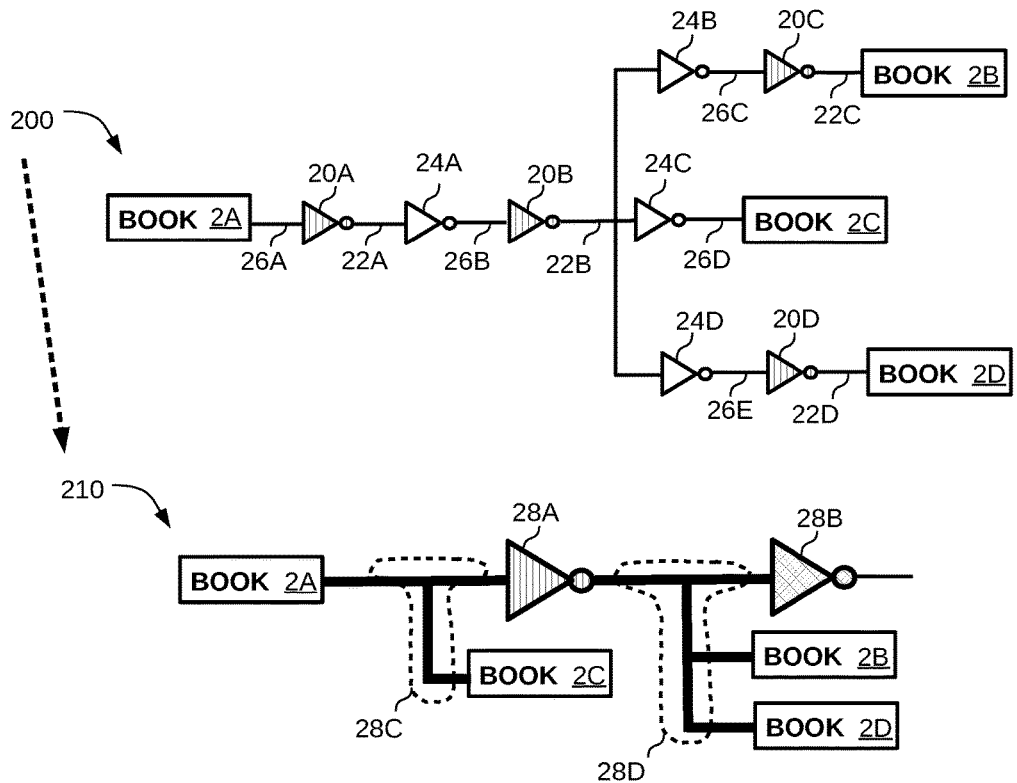
FIG. 2 is a block diagram illustrating an example of a fourth reduced netlist, according to embodiments of the disclosure.

FIG. 2 illustrates an example circuit represented as source netlist 200, which can be represented as reduced netlist 210 by combining equivalent nodes and edges of netlist 200 into abstract nodes and edges to include in reduced netlist 210. For purposes of illustrating the disclosure, but not limiting to embodiments, nodes in netlist 200 include inverter nodes, 20A-20D and 24A-24D, and book nodes, 2A-2D, and edges 26A-26E and 22A-22D that connect the inverter and book nodes. Each of the inverters and book nodes can have a property or metric, such as gate and/or cross-over current capacitance and/or leaking width. Edges in netlist 200 can represent wires in the circuit having, for example, a wire capacitance. Netlist 210 can be analyzed to determine properties or behaviors of the circuit represented as netlist 200, for example to analyze power characteristics of the circuit.

FIG. 2 illustrates an example of forming a reduced netlist by combining (e.g., merging) functionally equivalent nodes across a combination of nodes in the source netlist. In example source netlist 200, each of inverters 20A-20D perform the same function; that is, each effectively inverts the logic state of edge 26A and so are functionally equivalent. Each of inverters 24A-24D perform the same function; that is, each effectively inverts the logic state of edge 22A and so are functionally equivalent.

Accordingly, as shown in the example reduced netlist 210 of FIG. 2, inverters 20A-20D can be merged into abstract inverter node 28A, and inverters 24A-24D can be merged into abstract inverter node 28B. Edges 26B-26E, in source netlist 200, have the same logic state as edge 26A and so are equivalent; similarly, edges 22B-22D have the same logic state as edge 22A and so are equivalent. Correspondingly, equivalent edges 26A-26E can be merged into abstract edge 28C, and equivalent edges 22A-22D can be merged into abstract edge 28D.

For purposes of, for example, performing power analysis of the circuit, abstract inverters 28A and 28B in netlist 210 can be assigned, for example, a lumped capacitance (e.g., lumped gate or cross-over current capacitance), or leaking width, combining the individual capacitances, and/or leaking width, respectively, of corresponding equivalent nodes in netlist 200.

In embodiments the lumped capacitance and/or leaking width, of abstract nodes and/or edges can be the sum of the capacitances and/or leaking widths of their corresponding source netlist equivalent nodes and/or edges. For example, in reduced netlist 210 abstract node 28A can be assigned a lumped node capacitance (e.g., device or gate, and/or cross-over current, capacitance), and/or leaking width, that is the sum of the node capacitance of each of netlist 200 inverters 20A-20D and abstract node 28B can be assigned a lumped node capacitance, and/or leaking width, that is the sum of the node capacitance of each of netlist 200 inverters 24A-24D. In some embodiments, the node capacitances, and resulting lumped capacitance, can be summed for various voltage threshold (VT) values, for example to separate cross-current components of the capacitance.

In reduced netlist 210, edge 28C can be assigned a lumped wire capacitance that is the sum of that off each of edges 26A-26E and edge 28D can be assigned a lumped wire capacitance that is the sum of that off each of edges 22A-22D. In alternative embodiments, the lumped capacitance and/or lumped leaking width, of an abstract node and/or edge can be determined according to other combinations of the individual source netlist node and/or edge capacitances and/or leaking widths (e.g., mathematical formulas that include cell or component geometries or other such properties).

While not shown in the example of FIG. 2, cells in a netlist that represent a combination of components, such as a book, can also be equivalent and the equivalent books can be merged into an abstract book for inclusion in a reduced netlist. For example, in netlist 200, books 2B and 2D are connected by a series of an odd number of inverters such that both books 2B and 2D receive the inverted logic state of edge 26A. If books 2B and 2D perform the same logic function (for example), they can be equivalent with respect to netlist 200 and can be merged into a single, abstract book (not shown), such as an abstract book combining books 2B and 2D in netlist 210 as connected to edge 28D as an input. Correspondingly, parameters (e.g., capacitances or leaking width) of the source netlist books can be combined (e.g., summed) to assign a lumped value to the abstract book.

It would be apparent to one of ordinary skill in the art that a source net list can include equivalent nodes of a variety of compositions and, according to the disclosure, be combined in a reduced netlist into an abstract node. It would be further apparent to one of ordinary skill in the art that such an abstract node in a reduced netlist can be assigned a property combining corresponding properties of their corresponding equivalent source netlist nodes of a variety of compositions.

Figure 3:
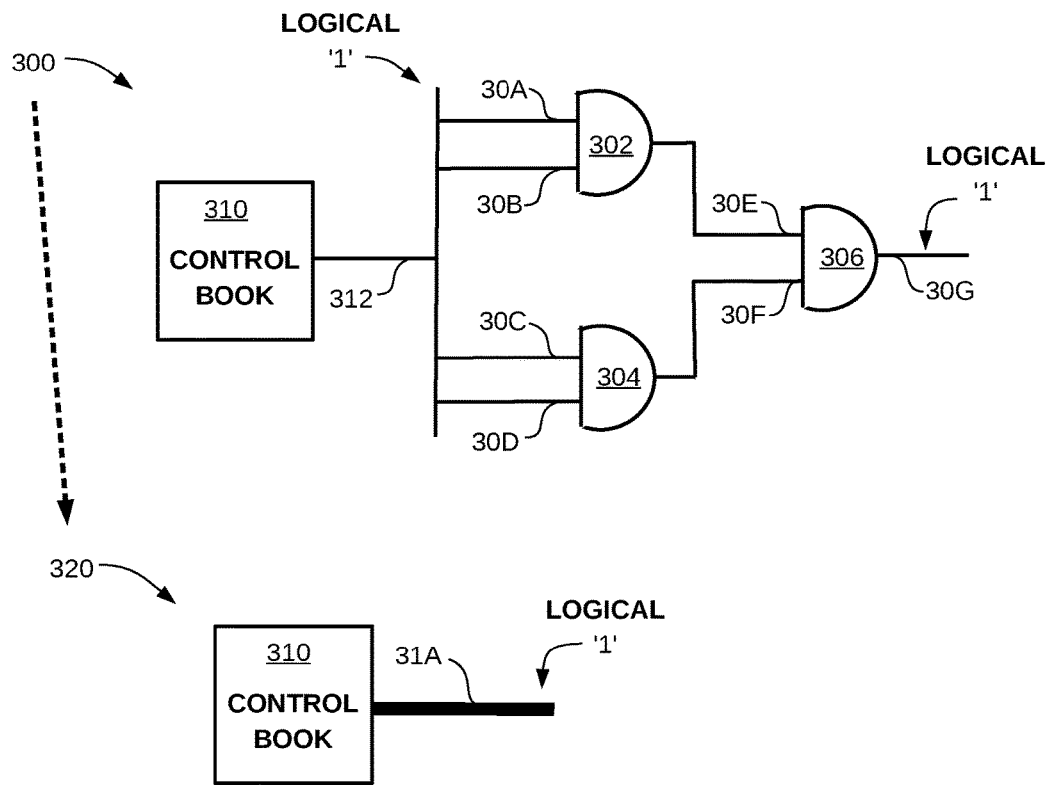
FIG. 3 is a block diagram illustrating an example of a fifth reduced netlist, according to embodiments of the disclosure.

FIG. 3 illustrates an example source netlist, 300, in which example nodes (AND gates, in the example of FIG. 3) are logically equivalent based on being operated, for purposes of analyzing the circuit, in a static state with the same inputs states. A particular combination of cells in a circuit can be in a static state in, for example, particular modes or times of operation of a circuit. For example, a circuit can include particular cells that change state only in test modes of circuit but are isolated (e.g., gated, or not clocked) from dynamic state changes (e.g., switching) in other (e.g., normal operating) modes of circuit operation. In some embodiments, cells that, for example, are in a static state and that share the same input states (e.g., logically one or zero), and/or their input edges, can be logically equivalent.

In embodiments a reduced netlist can be formed that combines nodes from the source netlist that are logically equivalent as in a static state and having the same input states during operating modes of the circuit to be analyzed (e.g., during dynamic power analysis). For example, reduced netlist 320 can be formed by combining such logically equivalent nodes and edges of source netlist 300.

In the example of FIG. 3, logical AND gates 302, 304, and 306 in source netlist 300 can be in a static state in certain modes of operation (e.g., an operational mode) of a circuit that includes them. For example, control book 310 can establish a static state of AND gates 302 and 304, such as by providing a static logical "1" input value at all inputs, 30A-30D, to gates 302 and 304. As the outputs of AND gates 302 and 304 are inputs to AND gate 306, maintaining a static state of AND gates 302 and 304 correspondingly maintains a static state, with the same static input (30E and 30F) states, of AND gate 306. Accordingly, AND gates 302, 304, and 306 can be logically equivalent, inputs 30A-30F can be logically equivalent, and outputs 312 and 30G can be logically equivalent.

In embodiments, nodes, and/or their respective input and output edges, that are static and have the same input and output values can be merged into a single output abstract edge, 31A, at the output of control book 310, as in the example reduced netlist 320 of FIG. 3. For purposes of, for example, performing power analysis of the circuit, abstract edge 31A in netlist 320 can be assigned, for example, a lumped capacitance (e.g., lumped gate and/or cross-over current capacitance) and/or leaking width, combining the individual capacitances, and/or leaking widths, respectively, of AND gates 302, 304, and 306, and input and output edges 312 and 30A-30G.

In embodiments lumped capacitance and/or leaking widths of compressed abstract edge 31A in netlist 310 can be, for example, the sum of the capacitances, and/or leaking widths, respectively, of the individual netlist 300 AND gates, and their respective inputs and outputs. In alternative embodiments, the lumped capacitance and/or lumped leaking width, of an abstract node and/or edge can be determined according to other combinations of the individual source netlist node and/or edge capacitances and/or leaking widths (e.g., mathematical formulas that include cell or component geometries or other such properties).

In alternative embodiments (not shown), logically equivalent nodes (e.g., AND gates 302, 304, and 306) can be compressed into one or more abstract nodes, and the logically equivalent input and/or output edges of the nodes can be compressed into abstract input and output edges of the node(s), respectively. A reduced netlist can be formed with such an abstract node and edge(s), for example, to account for the effect of input pin state on leakage power in a power analysis of a circuit. To illustrate, in an alternative embodiment, netlist 320 can have a single, abstract AND gate (not shown), merging AND gates 302, 304 and 306 and connected by an abstract input edge from control block 310. The abstract AND gate can be assigned a lumped capacitance combining that of those source netlist AND gates 302-306. An abstract input edge connecting the abstract AND from gate control block 310 can be assigned a lumped capacitance combining that of netlist 300 edge 312 and the input edges to gate 306. The abstract AND gate can retain output edge 30G from AND gate 306, and be assigned the edge capacitance of edge 30G.

It would be apparent to one of ordinary skill in the art that the compressed abstract node(s) and/or edge(s) can be assigned lumped capacitances and/or leaking widths, or other parameters of interest in an analysis of the circuit, by combining the corresponding parameters of the source netlist nodes and/or edges.

Figure 4A:
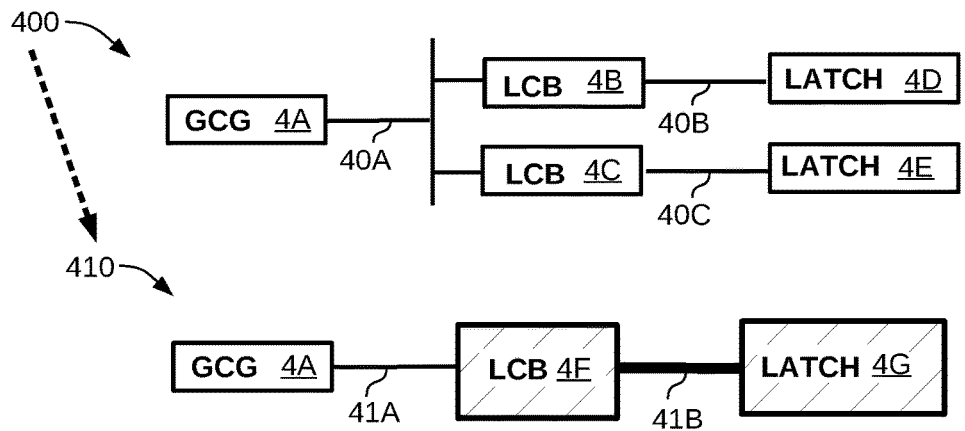
FIG. 4A is a block diagram illustrating an example of a sixth reduced netlist, according to embodiments of the disclosure.

FIG. 4A illustrates an example source netlist (400) in which logically equivalent nodes are cloned cells (e.g., logic gates or design books) that sink a common signal source. A particular set or combination of cells in a circuit can be replicas (e.g., "clones") of another identical set or combination of cells in the circuit. For example, synthesizing a logic circuit from a design description (e.g., a register transfer level description) can generate a combination of identical logic units (e.g., books or logic gates) that are identical, or "clones", and the cloned logic units can share a common source input. In some embodiments, cloned cells in a netlist can have a common naming schema, such that an analysis program can identify the cloned cells, for example, by shared components of their cell names in a netlist (e.g., cell_X_100, cell_X_101, cell_X_102, and so forth).

In embodiments, cloned nodes in a circuit that receive (or, "sink") the same input source (or, logically or functionally the same input—for example a common source signal received through different electrical buffers) can be logically equivalent. In alternative embodiments, cells may not be clones, but can be functionally equivalent. A reduced netlist can be formed that merges equivalent cloned nodes, and/or functionally equivalent nodes, and edges into abstract nodes and edges in the reduced netlist. For example, reduced netlist 410 can be formed by merging equivalent cloned and/or functionally equivalent nodes and edges of source netlist 400.

In FIG. 4A, source netlist 400 can represent, for example, a clocking circuit having a global clock generator (GCG) whose outputs are distributed, in parallel, to local clock buffers (LCBs), which in turn clock latch (or flip-flop) cells. In source netlist 400, clock output 40A of GCG 4A is distributed as parallel inputs to LCBs 4B and 4C. LCBs 4B and 4C provide clock signals 40B and 40C, respectively, to latch cells 4D and 4E.

LCBs 4B and 4C can be logically equivalent cloned cells. For example, circuit synthesis of the example clock distribution tree can select the same cell design to instantiate LCB 4B and LCB 4C, which also receives GCG clock output, 40A (and, in some embodiments, additional LCBs sharing GCG 4A clock output 40A). Latch cells 4D and 4E can include other inputs (not shown), such as, for example, one or more input states to store within the latch cell. In embodiments, LCB 4C can be a clone (e.g., a replicated instance) of the cell (or, cell design) that forms LCB 4B. In other embodiments, latches 4D and 4E may not be logically equivalent but can yet be functionally equivalent (e.g., given the same inputs, under particular operating condition or modes, latch 4D and 4E produce the same output, or outputs).

An analysis of netlist 400 can identify LCBs 4B and 4C as cloned cells that share GCG 4A clock output 40A as inputs and. accordingly, determine that LCBs 4B and 4C are logically equivalent. LCBs 4B and 4C can be merged into abstract LCB 4F to include in reduced netlist 410. Further analysis of source netlist 400 can determine that latches 4D and 4E are logically, or functionally, equivalent and can merge latches 4D and 4E into abstract latch 4G to include in reduced netlist 410.

For purposes of, for example, performing power analysis of the circuit, abstract LCB 4F can be assigned, for example, a lumped capacitance (e.g., lumped gate and/or cross-over current capacitance) and/or leaking width, combining the individual capacitances, and/or leaking widths, respectively, of LCBs 4B and 4C. Abstract latch 4G can be assigned, for example, a lumped capacitance (e.g., lumped gate and/or cross-over current capacitance) and/or leaking width, combining (e.g., summing) the individual capacitances, and/or leaking widths, respectively, of latches 4D and 4E.

Input and/or output edges associated with the LCBs and latches can be logically equivalent and can be merged into abstract input or output edge (respectively) in netlist 410. For example, input edges to LCBs 4B and 4C can be merged to form abstract edge 41A as the input edge to abstract LCB 4F, and netlist 400 edges 40B and 40C can be merged to form abstract edge 41B as the input edge to abstract latch 4G. Abstract edge 41A can be assigned a lumped edge metric such as, for example, the capacitance of edge 40A, and abstract edge 41B can be assigned a lumped edge metric such as, for example, a lumped capacitance combining (e.g., summing) that of edges 40B and 40C.

Figure 4B:
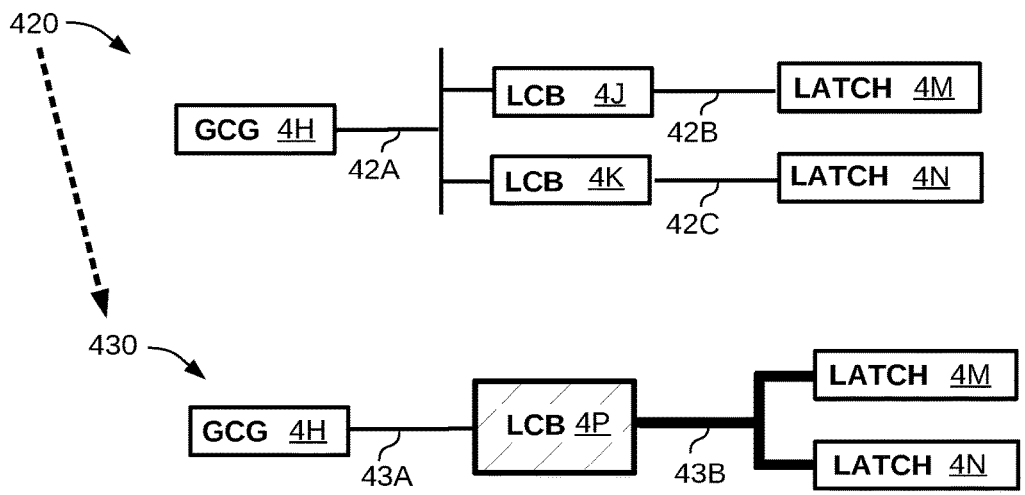
FIG. 4B is a block diagram illustrating an example of a seventh reduced netlist, according to embodiments of the disclosure.

FIG. 4B illustrates an alternative example embodiment of a source netlist in which some nodes are clones and other nodes are not equivalent and cannot be merged. Source netlist 420 represents a clock generator circuit similar to that of source netlist 400 in FIG. 1A. GCG 4H provides a clock output edge 42A that is input (also as 42A) in parallel to LCBs 4J and 4K. LCB 4J provides the clock signal from edge 42A on edge 42B as an input to latch 4M. LCB 4K provides the clock signal from edge 42A on edge 42C as an input to latch 4N. As illustrated in example reduced netlist 430, LCBs 4J and 4K can be clones and can be merged into abstract LCB node 4P. Abstract edge 43A, in reduced netlist 430, can be formed as the merged combination of the input edges 42A to LCBs 4J and 4K.

However, in the example of source netlist 420, latches 4M and 4N are not equivalent and so cannot be merged into an abstract latch node in reduced netlist 430. On the other hand, edges 42B and 42C can be equivalent (for example, as providing equivalent buffered clock inputs to latches 4M and 4N, respectively) and can be merged into an abstract edge 43B. As latches 4M and 4N cannot be merged, abstract edge 43B provides a parallel input, in netlist 430, to each of latches 4M and 4N.

As further illustrated in the example of FIG. 4B, abstract LCB node 4P can be assigned a lumped node metric that combines node metrics of each of LCBs 4J and 4K. For example, LCB 4P can be assigned, or associated with, a device capacitance (e.g., the gate capacitance of a transistor device) and the lumped node capacitance can be the sum of the device (or, gate) capacitances of LCBs 4J and 4K. Similarly, abstract edge 43B can be assigned a lumped edge metric that combines edge metrics of each of edges 42B and 42C. For example, abstract edge 43B can be assigned, or associated with, a wire capacitance and the lumped wire capacitance can be the sum of the wire capacitances of edges 42B and 42C. Similarly, abstract edge 43A can be assigned, or associated with, the wire capacitances of source netlist 420 edges 42A.

The examples of FIG. 4A and FIG. 4B illustrate lumped node and edge metrics computed as the sums of source netlist equivalent node and edge metrics. However, it would be apparent to one of ordinary skill in the art that, in alternative embodiments, the lumped capacitance and/or lumped leaking width, of an abstract node and/or edge can be determined according to other combinations of the individual source netlist node and/or edge capacitances and/or leaking widths (e.g., mathematical formulas that include cell or component geometries or other such properties).

Figure 5:
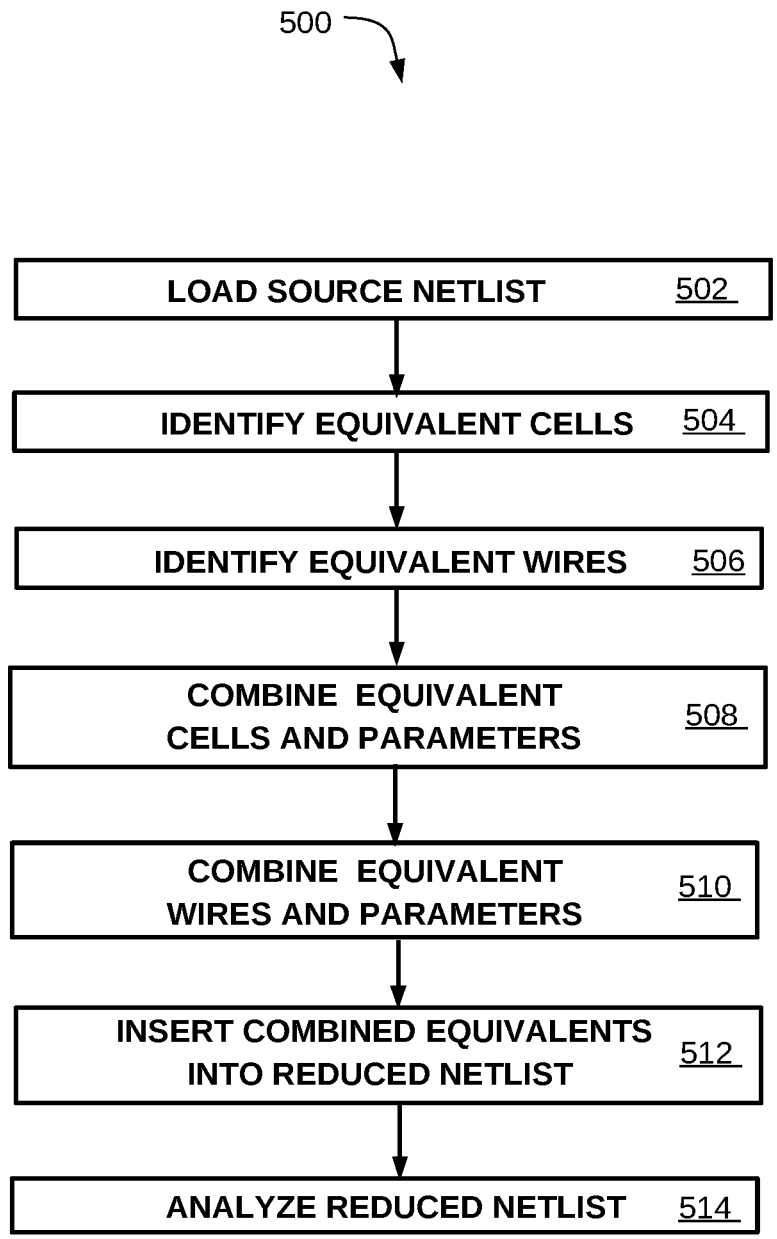
FIG. 5 is a flowchart that illustrates an example method to form a reduced netlist, according to embodiments of the disclosure.

FIG. 5 illustrates an example method 500 to combine equivalent nodes (cells) and edges (wires) included in a source netlist to form a reduced netlist. For purposes of illustration, but not limiting to embodiments, the method is described as performed by a circuit analysis program (hereinafter, "analysis program", or "program,"), in which electronic components (or, books) or logic cells of a circuit are nodes, and wires are edges, in the source netlist.

An analysis program can be, for example, a program that can model or simulate the behavior of a circuit to analyze various properties (e.g., electrical properties) of the circuit or elements thereof. For example, an analysis program can determine power properties (e.g., dynamic, short circuit, or leaking power) of a circuit, or sub-circuits or components of a circuit. An analysis program can analyze the circuit to determine, for example, dynamic, leakage, or short circuit power behavior or consumption. An analysis program can analyze a circuit by stimulating the circuit with particular input values (e.g., voltages, voltage threshold, or logic values) and the analysis program can monitor the response of particular components (e.g., circuit cells) of the circuit, or the circuit as a whole (e.g., total power consumption, or a resulting voltage or logic value). An analysis program can include particular voltage or temperature thresholds, for example, in modeling the behavior of the cells or circuit as a whole. However, it would be apparent to one of ordinary skill in the art that various alternative embodiments can perform method 500.

At 502 the analysis program opens (or, in some manner accesses) a source netlist representing a circuit. At 504 the analysis program analyzes the source netlist to identify equivalent cells, and at 506 the analysis program analyzes the source netlist to identify equivalent wires. Cells, or wires, can be logically, or functionally, equivalent in a source netlist based on, for example, having the same function, being held in a static state of operation with the same static input states, or being clones that sink a common signal source, and other forms of equivalence such as described in regard to FIGS. 1A-1B, FIG. 2, FIG. 3, and FIGS. 4A and 4B.

At 508 the analysis program combines the logically equivalent cells into an abstract cell. As used herein, "abstract cell" refers to a cell which represents a plurality of identified equivalent cells of a source netlist. A reduced netlist can combine parameters of interest (e.g., capacitance or leaking width) of each of the individual logically equivalent source netlist cells into a combined, or "lumped", value associated with the abstract cell.

At 510 the analysis program combines the logically equivalent wires associated with logically equivalent cells into an abstract wire. As used herein, "abstract wire" refers to a wire which represents a plurality of identified logically equivalent wires of a source netlist. A reduced netlist can combine the parameters of interest (e.g., capacitance) of each of the individual logically equivalent source netlist wires into a combined, or "lumped", value associated with the abstract wire.

At 512, the analysis program forms a reduced netlist that can include the cells and wires of the source netlist with the abstract cell (or, cells) and/or abstract wire (or, wires) substituting, in the reduced netlist, for the corresponding collective of equivalent cells and/or wires of the source netlist. For example, an embodiment can form a reduced netlist in the various manners described in regard to FIGS. 1A-1B, FIG. 2, FIG. 3, and FIGS. 4A and 4B.

At 514, the analysis program analyzes the reduced netlist to determine the behavior of interest (e.g., dynamic, leakage, or short circuit power) of the circuit represented by the source netlist. The results of the analysis of the reduced netlist can thereby substitute for analyzing the larger, source netlist.

In an embodiment, the analysis program can perform the method dynamically (e.g., "on-the-fly"), as part of analyzing (e.g., simulating a set of inputs) a source netlist. In other embodiments, an analysis program (or, another program) can perform elements of the method—for example 502 through 512, only 502 and 504, or only 502—to prepare a reduced netlist, or components thereof, for a subsequent analysis. Embodiments can perform the method iteratively, for each particular set of circuit input stimuli, for example, or for a set of particular input stimuli, and can perform the method in preparation for each simulation, or during each simulation.

Figure 6A:
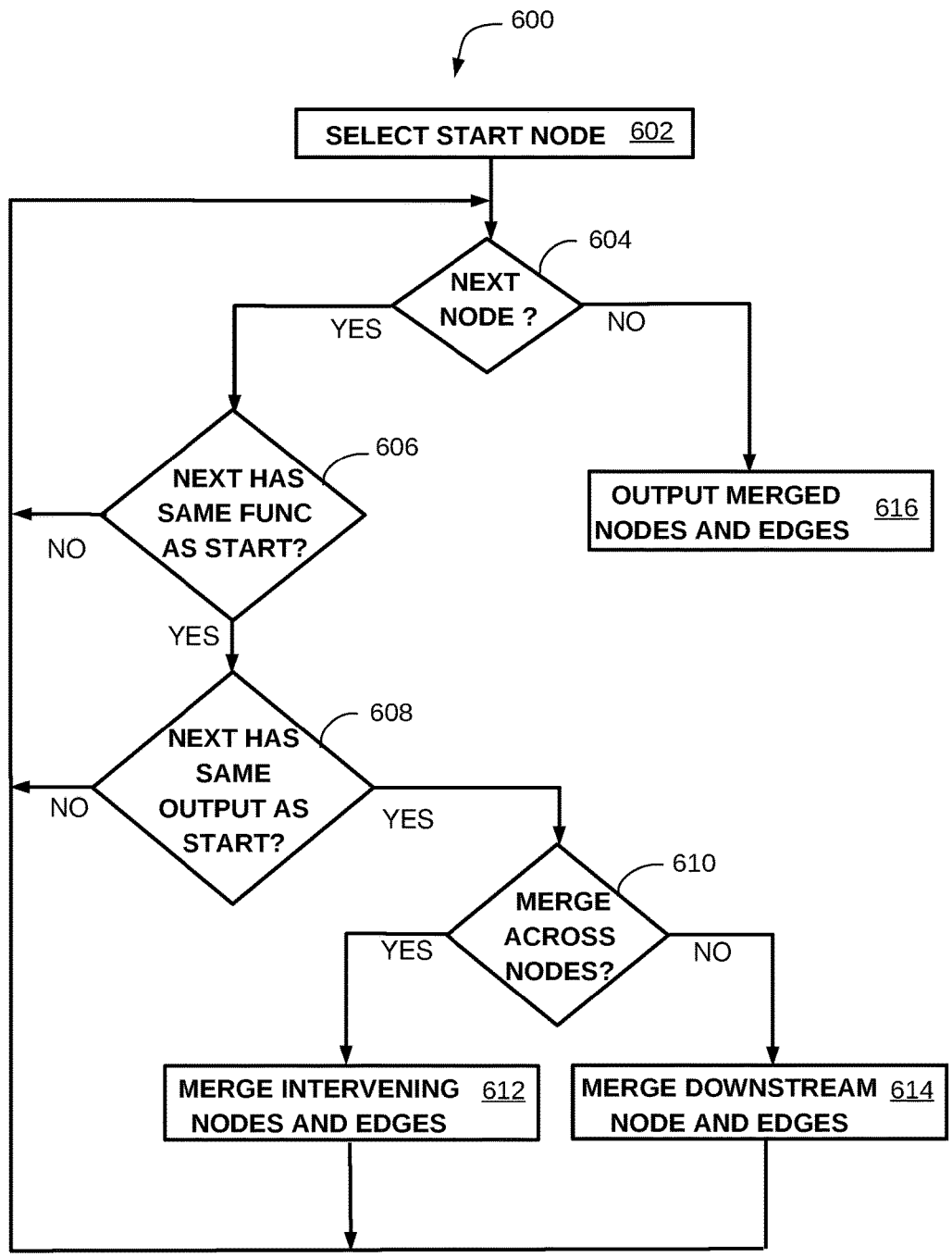
FIG. 6A is a flowchart that illustrates an example method to identify equivalent nodes and edges in a netlist, according to embodiments of the disclosure.

FIG. 6A illustrates an example method, 600, to merge nodes and/or edges in a source netlist that are functional equivalents and/or logical equivalents. An embodiment can perform method 600, for example, to perform 504 and/or 506 of method 500. A combination of nodes can be functional equivalents in that they preserve a function (e.g., inversion of a logic input to its logical compliment) across a combination of nodes. Nodes can be logically equivalent in that they receive the same inputs and produce the same corresponding outputs.

The method can, for example, identify and merge equivalent cells and wires (or, nodes and edges) in a source netlist in the various manners, for example, such as described in regard to FIG. 1A, FIG. 1B, and FIG. 2. In a particular example, FIG. 1A, as previously described, illustrates merging across nodes, in producing reduced netlist 100B, and merging logically-equivalent nodes, in producing reduced netlist 100C.

For purposes of illustration, but not limiting to embodiments, the method is described as performed by a circuit analysis program, such as (for example) described in regards to method 500, and in which electronic components (or, books) or logic cells of a circuit are nodes, and wires are edges, in the source netlist. However, it would be apparent to one of ordinary skill in the art that various alternative embodiments can perform method 600.

However, it would be apparent to one of ordinary skill in the art that alternative embodiments can utilize other criteria or determinations (e.g., an electrical characteristic, a position or location within a netlist, etc.), to identify source netlist nodes and/or edges as logically or functionally equivalent and that an embodiment other than an analysis program can perform method 600.

At 602, the analysis program selects a start node that is connected to a root node of a source netlist, or a sub-circuit of a source netlist, to identify nodes and/or edges that are logically, or functionally, equivalent. For example, with reference to FIG. 1A, book 10A can be a root node for circuit of source netlist 100A. At 602 the analysis program can select inverter 10B, connected to book 10A output edge, as a start node. In some embodiments, at 602 an analysis program can select the root node of a source netlist as a start node.

At 604 the analysis program traverses the output of the start node to determine if it connects to a node downstream of the start node (hereinafter, "downstream node"). If there is a downstream node, at 606 the analysis program determines if the downstream node has the same function (e.g., a logic function, such as inversion, or logical AND) as the start node. If so, at 608 the analysis program determines if the downstream node has the same output (e.g., logic state) as the start node.

If, at 606, the analysis program determines that the downstream node does not have the same function as the start node, or at 608 the analysis program determines that the downstream node does not have the same output as the start node, at 604 the analysis program selects another downstream node. The next downstream node can be, for example, a node connected directly in series with the current downstream node, or can be a node connected directly to an edge that connects a plurality of next downstream nodes in parallel from the current downstream edge.

If, at 604, there is not another downstream node, at 616 the program outputs the merged nodes and edges, to complete performing method 600. For example, at 616, the analysis program can form, or insert into, a reduced netlist substituting the merged node and edges for the collective, equivalent source nodes and edges. In another example, at 616 the analysis program can output the abstract node and/or edge to 512 of method 500 in FIG. 5. In embodiments, at 616 the program can output lumped node and/or edge metrics associated with the merged node and edges.

If, at 606, the analysis program determines that the downstream node has the same function as the start node, and at 608 the analysis program determines that the downstream node has the same output as the start node, at 610 the analysis program determines if it is merging across a combination of nodes or, alternatively, merging only logically equivalent nodes.

If merging across a combination of nodes, at 612 the program merges the current downstream node, and any previously identified, or selected, downstream nodes, and their corresponding edges with the start node and its corresponding edges to form a merged (e.g., abstract) node and/or merged (e.g., abstract) edges. In embodiments, at 612 the program can lump node and/or edge metrics of the source netlist equivalent nodes and/or edges and can associate the lumped metrics with the merged node and edges.

If, on the other hand, at 610 the analysis program determines it is merging only logically equivalent nodes, at 614 the program merges the current downstream node, and its corresponding edges, with the start node and its corresponding edges to form a merged (e.g., abstract) node and/or merged (e.g., abstract) edges. In embodiments, at 614 the program can lump node and/or edge metrics of the source netlist equivalent nodes and/or edges and can associate the lumped metrics with the merged node and edges.

At 604, the program determines whether there is another candidate downstream node to process. If not, at 616 the program outputs the merged nodes and edges, and any corresponding lumped node and/or edge metrics, to complete performing method 600. It would be apparent to one of ordinary skill in that art that an embodiment can, at 610, determine to both merge across a combination of nodes, for nodes that meet the criteria of preserving function in combination, and nodes that are logically equivalent, for nodes that meets the criteria of logical equivalence previously described, and to perform both 612 and 614, accordingly.

It would be further apparent to one of ordinary skill in the art that application of method 600 to a source netlist can merge functionally equivalent nodes, and/or edges, across a combination of nodes, and/or merge logically equivalent nodes, and/or edges, in a variety of alternative embodiments according to the illustrations of the disclosure. For example, application of method 600 can produce a reduced netlist that merges functionally equivalent nodes across a combination of nodes, such as to merge netlist 100A inverters 10B-10D, and edges 10G-10J to produce netlist 100B of FIG. 1A, or to merge netlist 200 inverters 20A-20D and edges 26A-26E of FIG. 2 to produce netlist 210. In another example, application of method 600, can produce a reduced netlist that merges logically equivalent nodes, such as to merge netlist 100A inverters 10B and 10D, and edges 10G and 10J to produce netlist 100C.

Figure 6B:
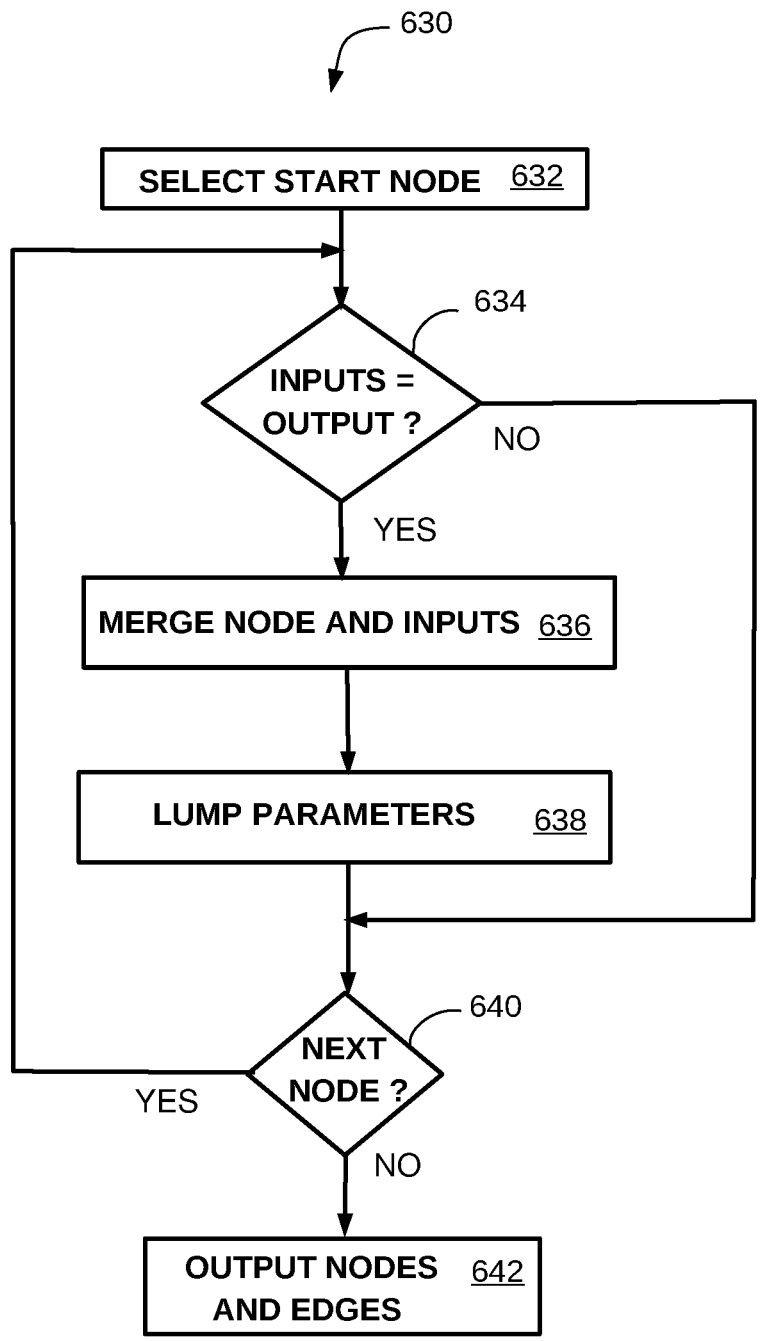
FIG. 6B is a flowchart that illustrates a second example method to identify equivalent nodes and edges in a netlist, according to embodiments of the disclosure.

FIG. 6B illustrates an example method 630 to merge nodes and/or edges in a source netlist that can be logically equivalent as having the same static inputs and outputs when operating under the same conditions. For purposes of illustration, but not limiting to embodiments, the method is described as performed by a circuit analysis program, such as the analysis program described in reference to FIG. 6A.

At 632, the analysis program selects a start node that is connected to a root node of a source netlist, or a sub-circuit of a source netlist, to identify nodes and/or edges that are logically equivalent. For example, with reference to FIG. 3, control book 310 can be a root node for circuit of source netlist 300. At 632 the analysis program can select, for example, AND gate 302, connected to control book 310 output edge 312, as a start node. In some embodiments, at 632 an analysis program can select the root node of a source netlist as a start node.

At 634 the analysis program determines whether the input(s) to the start node and the output of the start node are the same (e.g., the same logical "1" or "0" state). If they are the same, at 636 the program merges the node and its input edge(s) at its output edge. For example, in FIG. 3, AND gate 302 receives logical '1' at input edge 30A and 30B and outputs logical '1' at its output edge 30E. Accordingly, at 632 can analysis program can merge AND gate 302 and edges 30A, 30B, and 30E into a single, compressed edge (not shown in FIG. 3) at edge 30E. At 638, the analysis program combines parameters of the merged node and edges (e.g., capacitances and/or leaking width) as parameters assigned to the compressed edge at 30E.

If, at 634, the analysis program determines that the input(s) and output of the node are not the same, at 640 the program determines if there is a next node in the circuit downstream of the root node. If there is a next node, the program performs 634 to 638 with regard to that node. For example, with referenced to netlist 300 of FIG. 3, the program can select AND gate 304 and perform 634 to 638 to produce a compressed edge (not shown in FIG. 3) at edge 30F. Continuing with reference to FIG. 3, at 640 the program can select AND gate 306 and perform 634 to 638 to produce a compressed edge 30G that is included in reduced netlist 320 as edge 31A, and lumping the parameters of the entire combination of nodes and edges rooted at control block edge 312, as previously described in regard to FIG. 3.

At 640, if the program determines there are no next nodes (e.g., in FIG. 3, the method has merged the entire combination of nodes and edges rooted at control block edge 312 into a single, compressed edge such as 31A) the program, at 642, outputs the merged (or, compressed) node(s) and edge(s), and outputs lumped parameters associated with the merged node(s) and edge(s). For example, at 642, the analysis program can output the merged node(s) and/or edge(s), and any corresponding lumped node and/or edge metrics, to 512 of method 500 in FIG. 5.

Figure 6C:
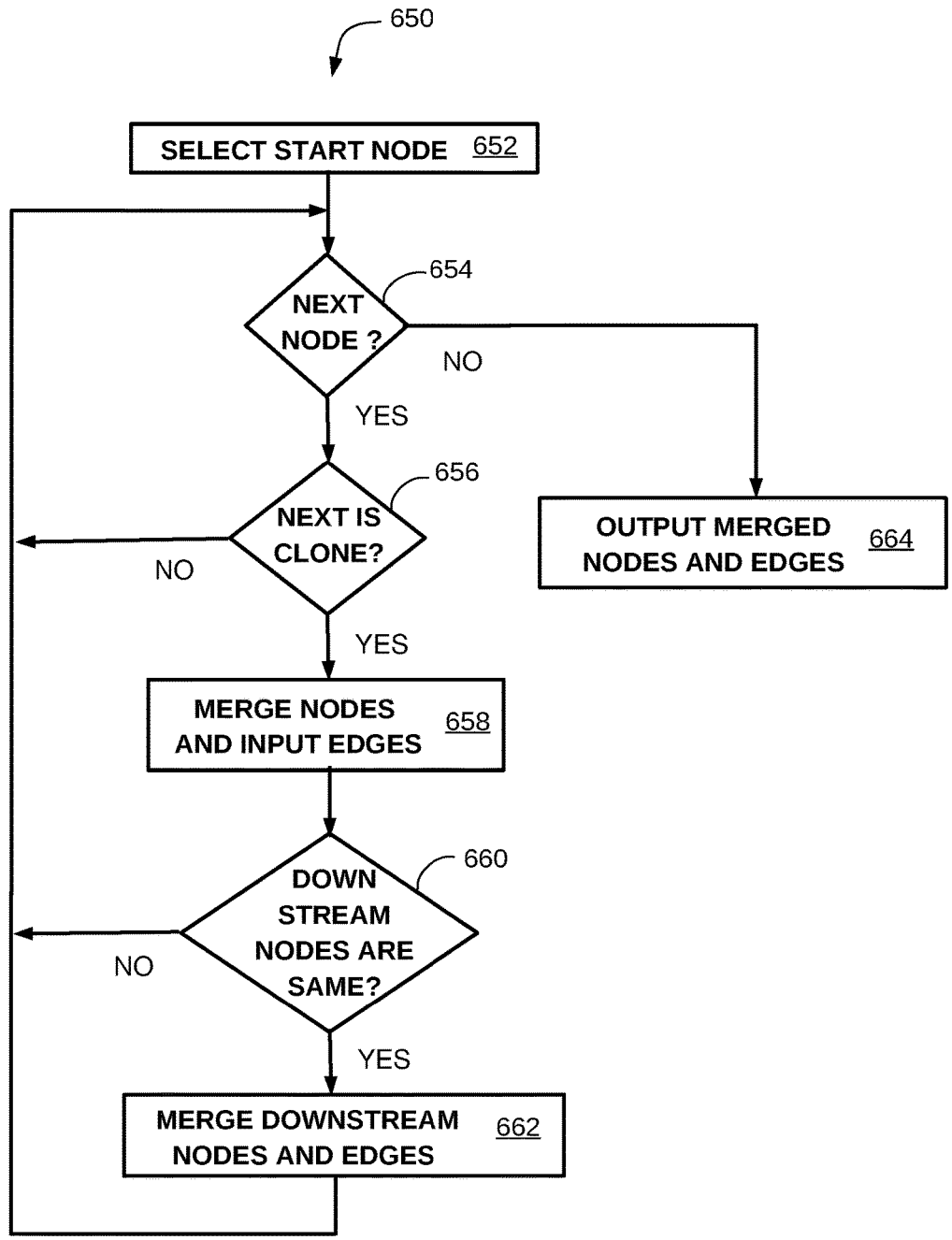
FIG. 6C is a flowchart that illustrates a third example method to identify equivalent nodes and edges in a netlist, according to embodiments of the disclosure.

FIG. 6C illustrates an example method 650 that can merge cloned nodes and/or edges in a source netlist that have a common source node. For purposes of illustration, but not limiting to embodiments, the method is described as performed by a circuit analysis program, such as the analysis program described in reference to FIG. 6A.

At 652, the analysis program selects a start node that is connected to a root node of a source netlist, or a sub-circuit of a source netlist, to identify nodes and/or edges that are logically equivalent. For example, with reference to FIG. 4, GCG 4A can be a root node for circuit of source netlist 400. At 652 the analysis program can select LCB 4B, connected to GCG 4A output edge 40A, as a start node. In some embodiments, at 652 an analysis program can select the root node of a source netlist as a start node.

At 654 the program determines if there is a next node that shares the input(s) to the start node as a common input source. For example, continuing with reference to FIG. 4, LCB 4C shares, with LCB 4B, the GCG 4A output edge 40A as an input source. At 654 the analysis program can select LCB 4C as a next node. At 656 the program determines if the start node and the next node are clones. For example, a source netlist may identify nodes by a naming schema that is indicative of the nodes being instances of a common design book (e.g., in netlist 400, LCB 4B can be named LCB Book 01 and LCB 4C can be named LCB Book 02).

If, at 656, the program determines the nodes are clones, at 658 the program merges the nodes, to form a merged (e.g., abstract) node, and their input edges, to form a merged (e.g., abstract) edge, at the common input source edge. For example, continuing with reference to FIG. 4, at 658 the program can merge LCBs 4B and 4C as merged node 4F, and can merge the inputs to LCBs 4B and 4C at edge 41A, such as shown in netlist 410. In embodiments, at 658 the program can lump node and/or edge metrics of the source netlist equivalent (e.g., cloned) nodes and/or edges and can associate the lumped metrics with the merged node and edges.

If, at 656, the program determines that the start and next node are not the same, at 654 the program determines if there is a next node that shares the start node input source and, if so, selects that node as a new next node. Alternatively, if, at 654, the program determines there is not a next node that shares the start node input source, at 664 the program outputs any merged nodes and/or edges, and outputs lumped parameters associated with the merged node(s) and edge(s). For example, at 664, the analysis program can output the merged nodes and/or edges, and any corresponding lumped node and/or edge metrics, to 512 of method 500 in FIG. 5.

At 660 the program determines whether the nodes downstream of the merged cloned nodes are the same. The downstream nodes can be the same if they perform the same function. For example, in FIG. 4, if latches 4D and 4E perform the same function (e.g., latch the same number and type of inputs and produce the same type and number of outputs), an analysis program can determine at 660 that the downstream nodes (e.g., latches 4D and 4e) are the same.

If, at 660 the program determines that the nodes downstream of the merged cloned nodes are the same, at 662 the program merges the downstream nodes and edges, and can combine parameters of interest (e.g., capacitance and/or leaking width) of the source netlist nodes to assign to the merged node. For example, with reference to FIG. 4, at 662 the program can merge netlist 400 latches 4D and 4E to form netlist 410 LCB 4F, and can merge the input edges 40B and 40C to form the merged edge 41B. The program can combine parameters of interest (e.g., capacitance and/or leaking width) of latches 4D and 4E, and edges 40B and 40C, to assign to merged latch 4F and edge 41B, respectively.

At 654, the program determines if there are additional next nodes that are clones of the start node and, if so, performs 656 to 662 to potentially merge the next node, and potentially its downstream nodes and edges, as a new merged node and edge(s) or with any merged node and edge resulting from merging other cloned nodes in performing the method. It would be apparent to one of ordinary skill in the art that method 650 an embodiment can repeat the method to select additional start nodes sharing a common source.

Figure 7:
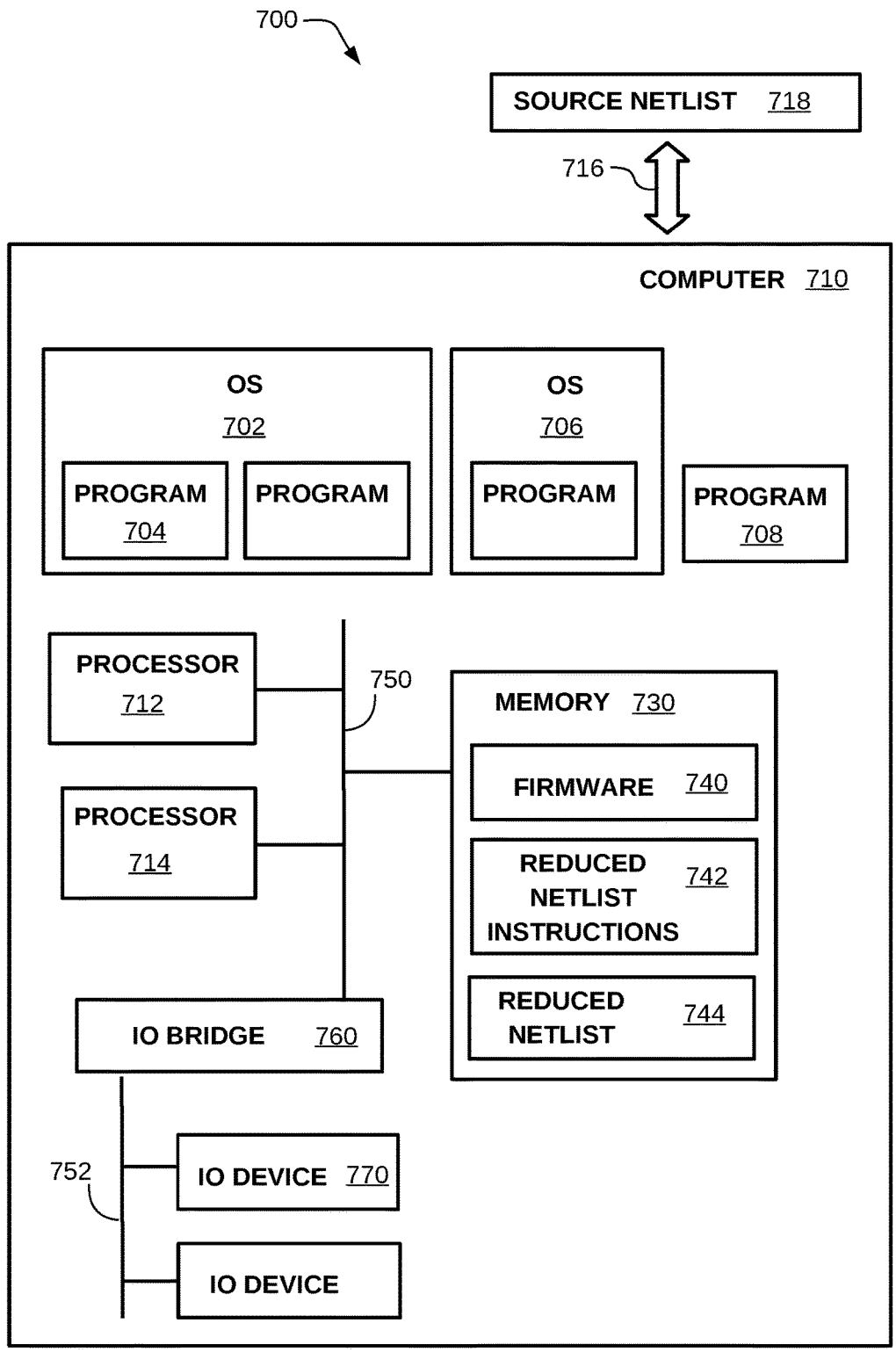
FIG. 7 is a block diagram illustrating a computer system, according to embodiments of the disclosure.

FIG. 7 depicts a computer system, 700, according to embodiments of the present disclosure. Computer system 700 includes a computer 710 having processors, such as processor 712 and 714. In embodiments processors can be a single processor or a multi-threaded processor, a general purpose or a special purpose processor, a co-processor, or any of a variety of processing devices that can execute computing instructions.

Computer system 700 is configured with interface 716 to enable computer 710 to receive a source netlist (718), such as the source netlist described in regard to FIGS. 1-7. In embodiments, the interface can enable computer 710 to receive, or otherwise access, source netlist 718 via, for example, a network (e.g., an intranet, or a public network such as the Internet), or a storage medium, such as a disk drive internal or connected to computer 710. The interface can be human or other input devices, such as described later in regard to components of computer 710. It would be apparent to one of ordinary skill in the art that the interface can be any of a variety of interface types or mechanisms suitable for a computer, or a program operating in a computer, to receive or otherwise access or receive a source netlist.

Processors included in computer 710 are connected by a memory interface 750 to memory 730. In embodiments a memory can be a cache memory, a main memory, a flash memory, or a combination of these or other varieties of electronic devices capable of storing information and making the information, or locations storing the information within the memory, accessible to a processor. A memory can be formed of a single electronic (or, in some embodiments, other technologies such as optical) module or can be formed of a plurality of memory modules. A memory, or a memory module (e.g., an electronic packaging of a portion of a memory), can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words).

In embodiments, a computer can include a plurality of memories. A memory interface, such as 750, between a processor (or, processors) and a memory (or, memories) can be, for example, a memory bus common to one or more processors and one or more memories. In some embodiments, a memory interface, such as 750, between a processor and a memory can be point to point connection between the processor and the memory, and each processor in the computer can have a point-to-point connection to each of one or more of the memories. In other embodiments, a processor (for example, 712) can be connected to a memory (e.g., memory 730) by means of a connection (not shown) to another processor (e.g., 714) connected to the memory (e.g., 750 from processor 714 to memory 730).

A computer can include an IO bridge, which can be connected to a memory interface, or to processor (not shown). An IO bridge can interface the processors and/or memories of the computer (or, other IO devices) to IO devices connected to the bridge. For example, computer 710 includes IO bridge 760 interfacing memory interface 750 to IO devices, such as IO device 770. In some embodiments, an IO bridge can connect directly to a processor or a memory, or can be a component included in a processor or a memory.

An IO bridge can be, for example, a PCI-Express or other IO bus bridge, or can be an IO adapter.

An IO bridge can connect to IO devices by means of an IO interface, or IO bus, such as IO bus 752 of computer 710. For example, IO bus 752 can be a PCI-Express or other IO bus. IO devices can be any of a variety of peripheral IO devices or IO adapters connecting to peripheral IO devices. For example, IO device 760 can be a graphic card, keyboard or other input device, a hard drive or other storage device, a network interface cards, etc. IO device 760 can be an IO adapter, such as a PCI-Express adapter, that connects components (e.g., processors or memories) of a computer to IO devices (e.g., disk drives, Ethernet networks, video displays, keyboards, mice, etc.).

A computer can include instructions executable by one or more of the processors (or, processing elements, such as threads of a processor). The instructions can be a component of one or more programs. As illustrated in the example of FIG. 7, computer 710 includes a plurality of programs, such as program 708 and program 704. A program can be, for example, an application program, an operating system or a function of an operating system, or a utility or built-in function of a computer. A program can be a hypervisor, and the hypervisor can manage sharing resources of the computer (e.g., a processor or regions of a memory, or access to an IO device) among a plurality of programs or OSes.

Programs can be "stand-alone" programs that execute on processors and use memory within the computer directly, without requiring another program to control their execution or their use of resources of the computer. For example, computer 710 includes stand-alone program 708. A stand-alone program can perform particular functions within the computer, such as controlling, or interfacing (e.g., access by other programs) an IO interface or IO device. A stand-alone program can, for example, manage the operation, or access to, a memory. A Basic I/O Subsystem (BIOS), or a computer boot program (e.g., a program that can load and initiate execution of other programs) can be a standalone program.

A computer can include one or more operating systems, and an operating system can control the execution of other programs such as, for example, to start or stop a program, or to manage resources of the computer used by a program. For example, computer 710 includes operating systems (OSes) 702 and 706, each of which can include, or manage execution of, one or more programs, such as OS 702 including (or, managing) program 704. In some embodiments, an operating system can function as a hypervisor.

A program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 710 includes firmware 740 included, or stored, in memory 730. In other embodiments, firmware can be embodied as instructions (e.g., comprising a computer program product) on a storage medium (e.g., a CD ROM, a flash memory, or a disk drive), and the computer can access the instructions from the storage medium.

In embodiments of the present disclosure, a computer program can perform methods of the disclosure to identify equivalent nodes (e.g., cells) and/or edges (e.g., wires) in a source netlist to form abstract nodes and/or abstract edges. A computer program can form a reduced netlist according to the embodiments of the disclosure. A computer program can combine parameters (e.g., capacitances and/or leaking widths) of equivalent nodes and/or edges in a source netlist, and can associate the combined parameters with abstract nodes and/or abstract edges, respectively, in a reduced netlist.

In embodiments of the present disclosure, a computer can include instructions to form a reduced netlist. Computer 710 includes, for example, reduced netlist instructions 742, which can operate to form reduced netlist 744. A computer can store the reduced netlist instructions and/or the reduced netlist in a memory of the computer, such as computer 710 storing the reduced netlist instructions 742 and reduced netlist 744 in memory 730. A computer can obtain the instructions, such as instructions 742, from a storage medium (e.g., a CD ROM, a flash memory, a DVD) or download the instructions from a network, to store in a memory, such as memory 730.

The example computer system 700 and computer 710 are not intended to limiting to embodiments. In embodiments, computer system $00 can include a plurality of processors, interfaces, and interfaces to obtain or access a source netlist, and can include other elements or components, such as networks, network routers or gateways, storage systems, server computers, virtual computers or virtual computing and/or IO devices, cloud-computing environments, and so forth. It would be evident to one of ordinary skill in the art to include a variety of computing devices interconnected in a variety of manners in a computer system embodying aspects and features of the disclosure.

In embodiments, computer 710 can be, for example, a computing device having a processor capable of executing computing instructions and, optionally, a memory in communication with the processor. For example, computer 710 can be a desktop or laptop computer; a tablet computer, mobile computing device, or cellular phone; or, a server computer, a high-performance computer, or a super computer. Computer 710 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one of ordinary skill in the art that a computer embodying aspects and features of the disclosure can be any of a variety of computing devices having processors and, optionally, memories and/or programs.

The present invention may be a system, a method, and/or a computer program product at any possible technical detail level of integration. The computer program product may include a computer readable storage medium (or media) having computer readable program instructions thereon for causing a processor to carry out aspects of the present invention, such as instructions 742.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many modifications and variations will be apparent to those of ordinary skill in the art without departing from the scope and spirit of the described embodiments. The terminology used herein is chosen to explain the principles of the embodiments, the practical application or technical improvement over technologies found in the marketplace, or to enable others of ordinary skill in the art to understand the embodiments disclosed herein.

What is claimed is:

1. A computer-implemented method for analyzing electrical power consumption in a circuit, wherein the analyzing electrical power consumption in a circuit comprises determining a power metric selected from the group consisting of dynamic power, leakage power, and short-circuit power, wherein the circuit comprises a plurality of circuit cells and a plurality of circuit wires, wherein a source netlist includes a plurality of circuit nodes included in the source netlist corresponding to a circuit cell included in the circuit, and a plurality of circuit edges included in the source netlist corresponding to a wire included in the circuit, and wherein the method comprises:

forming a compressed circuit node that combines a first circuit node and at least one second circuit node, wherein the first circuit node and the at least one second circuit node are included in the plurality of circuit nodes included in the source netlist, and wherein the forming the compressed circuit node is based, at least in part, on the first circuit node and the at least one second circuit node having a node equivalence, the node equivalence is selected from a group consisting of a logical equivalence and a functional equivalence; wherein the logical equivalence comprises the first circuit node and a first combination of the at least one second circuit node having the same operational activity, the first circuit node and a second combination of the at least one second circuit node having the same input and output states when held in a static state of operation, and the first circuit node and a third combination of the at least one second circuit node being cloned nodes that receive a common signal source, wherein the functional equivalence comprises the first circuit node and the at least one second circuit node producing the same output states upon each of the first circuit node and the at least one second circuit node receiving of the same input states, wherein the compressed circuit node includes a circuit of uncompressed nodes, wherein the uncompressed nodes comprise a series of logic inversion elements, wherein each of the logic inversion elements outputs an at least one logic output having a logic value complementary to a logic value of at least one input to the respective logic inversion element;

forming a first compressed circuit edge that combines a first circuit edge and at least one second circuit edge, wherein the first circuit edge and the at least one second circuit edge are included in the plurality of circuit edges included in the source netlist, and wherein the forming the first compressed circuit edge is based, at least in part, on the first circuit edge and the at least one second circuit edge having an edge equivalence, wherein the edge equivalence comprises the at least one second circuit edge having a state equivalent to a state of the first circuit edge;

forming a reduced netlist, wherein the reduced netlist includes a first subset of the plurality of circuit nodes included in the source netlist and a second subset of the plurality of circuit edges included in the source netlist, wherein the reduced netlist includes the compressed circuit node in substitution for the first circuit node and the at least one second circuit node, and wherein the reduced netlist includes the first compressed circuit edge in substitution for the first circuit edge and the at least one second circuit edge;

associating with the compressed circuit node, in the reduced netlist, a lumped node metric that combines a node metric associated with each of the first circuit node and the at least one second circuit node, the lumped node metric and the node metric are selected from a group consisting of device capacitance, cross-over current capacitance, and leaking width;

associating with the first compressed circuit edge, in the reduced netlist, a first lumped edge metric that combines a first edge metric associated with each of the first circuit edge and the at least one second circuit edge, wherein the first lumped edge metric and the first edge metric are wire capacitance;

forming a second compressed circuit edge that combines a third circuit edge and a third circuit node, wherein the third circuit edge is selected from a first group consisting of the first compressed circuit edge and an at least one fourth circuit edge included in the plurality of circuit edges included in the source netlist, wherein the third circuit node is selected from a second group consisting of the compressed circuit node and an at least one fourth circuit node included in the plurality of circuit nodes included in the source netlist, wherein the forming the second compressed circuit edge is based, at least in part, on the third circuit edge and the third circuit node having the same output states when receiving the same input states and held in a static state of operation;

substituting, in the reduced netlist, the second compressed edge for the third circuit edge and the third circuit node;

associating with the second compressed circuit edge, in the reduced netlist, a second lumped edge metric that combines wire capacitance associated with the third circuit edge and a second edge metric associated with the third circuit node, and wherein the second edge metric is selected from a group consisting of device capacitance, cross-over current capacitance, and leaking width; and fabricating, based upon an improvement to the circuit due to a power analysis using the reduced netlist, a semiconductor circuit.

* * * * *